United States Patent
Hirano

(10) Patent No.: US 11,097,747 B2
(45) Date of Patent: Aug. 24, 2021

(54) METHOD AND DEVICE FOR CONTROLLING AUTONOMOUSLY DRIVEN VEHICLE

(71) Applicant: Nissan Motor Co., Ltd., Yokohama (JP)

(72) Inventor: Tomohisa Hirano, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/977,585

(22) PCT Filed: Mar. 27, 2018

(86) PCT No.: PCT/JP2018/012413
§ 371 (c)(1),
(2) Date: Sep. 2, 2020

(87) PCT Pub. No.: WO2019/186692
PCT Pub. Date: Oct. 3, 2019

(65) Prior Publication Data
US 2020/0406921 A1 Dec. 31, 2020

(51) Int. Cl.
*B60W 60/00* (2020.01)
*B60W 30/12* (2020.01)
(Continued)

(52) U.S. Cl.
CPC .......... *B60W 60/001* (2020.02); *B60W 30/12* (2013.01); *B60W 50/087* (2013.01);
(Continued)

(58) Field of Classification Search
CPC ... B62D 15/025; B62D 6/00; B60W 2552/53; B60W 2510/20; B60W 60/001; B60W 30/12; B60W 50/087; G08G 1/16
(Continued)

(56) References Cited

U.S. PATENT DOCUMENTS 9,409,478 B2 8/2016 Okuda et al.
10,185,327 B1 * 1/2019 Konrardy ........... G01C 21/3453
(Continued)

FOREIGN PATENT DOCUMENTS

CN 107031505 A 8/2017
EP 3291136 A1 * 3/2018 ......... G06K 9/00798
(Continued)

*Primary Examiner* — Atul Trivedi
(74) *Attorney, Agent, or Firm* — Global IP Counselors, LLP

(57) ABSTRACT

A traveling position of a host vehicle is controlled using barrier lines as a reference. Autonomous driving is executed by either a both-side recognition control in which the position of the host vehicle is controlled based on left and right barrier lines, or a one-side recognition control in which the position of the host vehicle is controlled based on either one of the left or right the barrier lines. A region currently being traveled in is stored as a steering-wheel-turned region when a steering wheel is turned in one direction and subsequently turned in a returning direction due to the switching of control between the both-side recognition control and the one-side recognition control, and autonomous driving under the control preceding the steering-wheel-turned region is continued when the steering-wheel-turned region is subsequently traveled in.

7 Claims, 6 Drawing Sheets

(51) Int. Cl.
  *B60W 50/08* (2020.01)
  *B62D 15/02* (2006.01)
(52) U.S. Cl.
  CPC ....... *B62D 15/025* (2013.01); *B60W 2510/20* (2013.01); *B60W 2552/53* (2020.02)
(58) Field of Classification Search
  USPC .......................................................... 701/26
  See application file for complete search history.

(56) References Cited

U.S. PATENT DOCUMENTS

| | | | | |
|---|---|---|---|---|
| 2016/0207538 | A1* | 7/2016 | Urano | G05D 1/0061 |
| 2016/0272203 | A1 | 9/2016 | Otake et al. | |
| 2016/0358477 | A1* | 12/2016 | Ansari | G06Q 30/0251 |
| 2017/0120909 | A1* | 5/2017 | Oniwa | B60W 30/12 |
| 2017/0248957 | A1* | 8/2017 | Delp | B60W 30/00 |
| 2017/0349173 | A1* | 12/2017 | Nishiguchi | B62D 15/0255 |
| 2018/0037223 | A1* | 2/2018 | Goto | G05D 1/0231 |
| 2018/0065664 | A1* | 3/2018 | Watanabe | B62D 15/025 |
| 2018/0067496 | A1* | 3/2018 | Prasad | G01S 17/86 |
| 2018/0074492 | A1* | 3/2018 | Yamamoto | B60W 50/14 |
| 2018/0111628 | A1* | 4/2018 | Tamagaki | B60W 30/16 |
| 2018/0201307 | A1* | 7/2018 | Kudo | B62D 1/28 |
| 2018/0201317 | A1* | 7/2018 | Kudo | B62D 15/0255 |
| 2018/0238696 | A1* | 8/2018 | Takeda | G01C 21/3602 |
| 2018/0370544 | A1* | 12/2018 | Kitagawa | B60W 50/14 |
| 2019/0126927 | A1* | 5/2019 | Uejima | G05D 1/0212 |
| 2019/0143982 | A1* | 5/2019 | Hashimoto | B60W 30/12 701/23 |
| 2019/0152476 | A1* | 5/2019 | Hajika | G08G 1/167 |
| 2019/0152523 | A1* | 5/2019 | Hajika | B60W 30/12 |
| 2019/0308625 | A1* | 10/2019 | Iimura | B60W 30/165 |
| 2019/0310091 | A1* | 10/2019 | Maeda | G01C 21/30 |
| 2020/0079378 | A1* | 3/2020 | Ochida | B60W 50/082 |
| 2020/0148214 | A1* | 5/2020 | Tamagaki | B60W 30/14 |
| 2020/0180639 | A1* | 6/2020 | Mizoguchi | G05D 1/0214 |
| 2020/0247431 | A1* | 8/2020 | Ferencz | G05D 1/0246 |
| 2020/0307596 | A1* | 10/2020 | Yashiro | B60W 30/12 |
| 2020/0320882 | A1* | 10/2020 | Fujii | G06Q 50/30 |
| 2020/0339194 | A1* | 10/2020 | Kanoh | B62D 15/025 |
| 2020/0342756 | A1* | 10/2020 | MacKenzie | B60W 30/09 |
| 2020/0391731 | A1* | 12/2020 | Cheon | G06K 9/00805 |
| 2021/0046946 | A1* | 2/2021 | Nemec | B60W 50/14 |

FOREIGN PATENT DOCUMENTS

| | | | | |
|---|---|---|---|---|
| JP | 2005-346382 A | | 12/2005 | |
| JP | 2016-172531 A | | 9/2016 | |
| JP | 2016-194813 A | | 11/2016 | |
| JP | 2017-159723 A | | 9/2017 | |
| JP | WO2019073525 A1 | * | 11/2020 | ......... G06K 9/00791 |
| WO | 2014/016942 A1 | | 1/2014 | |
| WO | WO-2017119170 A1 | * | 7/2017 | ............. G08G 1/163 |
| WO | WO-2017200003 A1 | * | 11/2017 | ...... B60W 30/18163 |
| WO | 2018/008321 A1 | | 1/2018 | |
| WO | WO-2018047292 A1 | * | 3/2018 | ............ B60W 30/12 |

* cited by examiner

METHOD AND DEVICE FOR CONTROLLING AUTONOMOUSLY DRIVEN VEHICLE

CROSS-REFERENCE TO RELATED APPLICATIONS

This application is a U.S. national stage application of International Application No. PCT/JP2018/012413, filed on Mar. 27, 2018.

BACKGROUND

Technical Field

The present invention relates to a method and a device for controlling an autonomously driven vehicle, in which barrier lines displayed on a road are recognized and a traveling state of a host vehicle is controlled.

Background Information

There already exist techniques of recognizing barrier lines displayed on a road surface ahead of a host vehicle and, using the barrier lines as a reference, autonomously controlling a position of the host vehicle in a lane being traveled in. JP-A 2017-159723 discloses a technique in which barrier lines on both the left and right sides of the host vehicle (e.g., a roadway outside line on the left side and a lane boundary line on the right side) are recognized, and assistance is switched between autonomous driving assistance in which the position of the host vehicle is controlled based on the barrier lines on both sides so as to keep the host vehicle in the center of the lane, and autonomous driving assistance in which the position of the host vehicle is controlled to a predetermined distance from the barrier lines based on a barrier line on either one of the left and right sides of the host vehicle (e.g., the lane boundary line on the right side).

SUMMARY

With the technique described in JP-A 2017-159723, when it is difficult to perform appropriate control based on the left and right barrier lines in accordance with the barrier line situation close to a tool booth, control relating to autonomous driving assistance is switched from control based on both the left and right barrier lines to control based only on the barrier line on one side. For example, when the road widens close to a tool booth, control is switched before and after the road widens; before the road widens, the position of the host vehicle is controlled based on the left and right barrier lines, and after the road widens, the position of the host vehicle is controlled using only the right barrier line as a reference.

Thus, the technique described above is premised on there being a toll booth on the travel route of the host vehicle, and is generally applied through travel under autonomous driving.

Furthermore, when the technique described above is employed, it is assumed that the host vehicle will sway left and right along with a switching of control. Examples of factors include, inter alia, the stipulations of laws pertaining to road classification and width, but it is assumed that when the width of the roadway before widening is large, the host vehicle will be drawn near to the right barrier line after the switch and thereby sway to the right; conversely, when the width of the roadway before widening is small, the host vehicle is separated from the right barrier line after the switch and thereby sways to the left. When this swaying is severe, there is concern that the swaying will affect safety, ride quality, etc.

An object of the present invention is to provide a method and device for controlling an autonomously driven vehicle in which the problem described above is taken into consideration.

The invention according to one aspect provides a method for controlling an autonomously driven vehicle in which barrier lines demarcating a lane are used as a reference to control a position of a host vehicle in a lane being traveled in. In the method according to this aspect, barrier lines ahead of the host vehicle are recognized and autonomous driving is executed by either both-side recognition control in which the position of the host vehicle is controlled based on barrier lines on both the left and right sides of the host vehicle, or one-side recognition control in which the position of the host vehicle is controlled based on the barrier line on either one of the left and right sides of the host vehicle. A region currently being traveled in is stored as a steering-wheel-turned region when a steering wheel is turned in one direction and subsequently turned in a returning direction due to the switching of control between both-side recognition control and one-side recognition control, and autonomous driving under the control preceding the steering-wheel-turned region is continued when the steering-wheel-turned region is subsequently traveled in.

The invention according to another aspect provides a device for controlling the autonomously driven vehicle.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the drawings.

Overall Configuration of System

Figure 1:
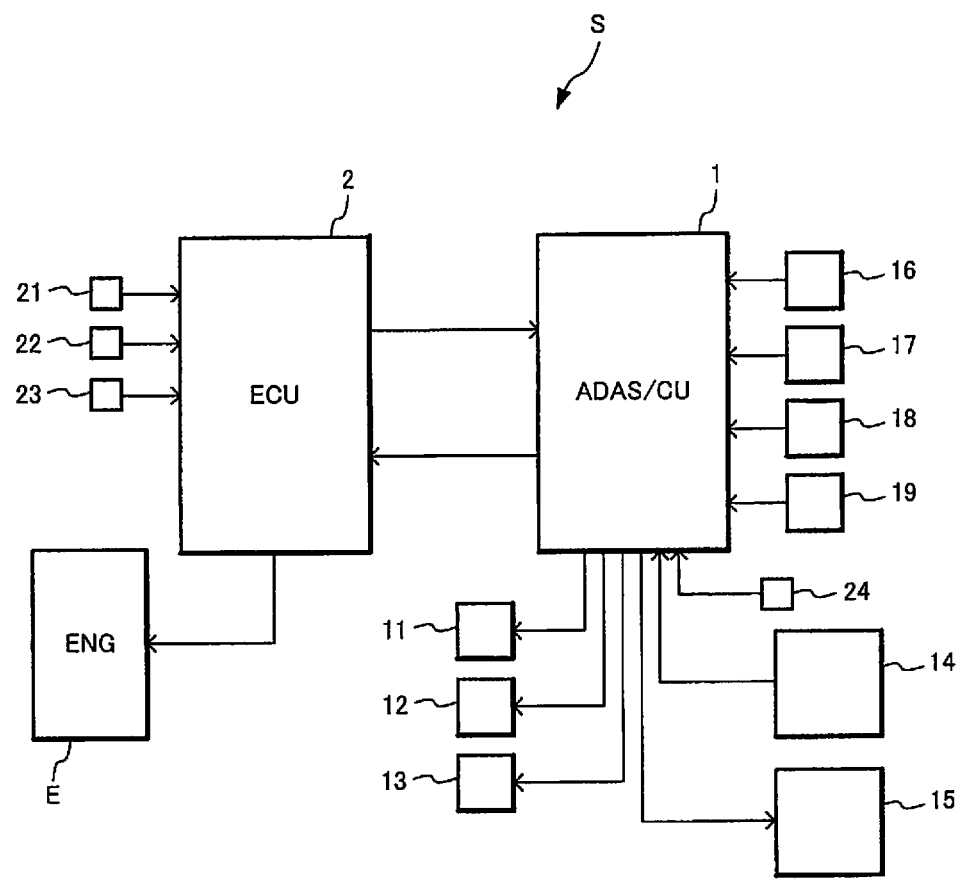
FIG. 1 is a schematic diagram of an overall configuration of a control system for an autonomously driven vehicle according to one embodiment of the present invention.

FIG. 1 schematically depicts an overall configuration of a control system S for an autonomously driven vehicle (referred to below as a "vehicle control system") according to one embodiment of the present invention.

The vehicle control system S comprises an internal combustion engine (referred to below simply as an "engine") E which is a propulsion source for a vehicle, a driving assistance system controller (ADAS/CU) 1, and an engine controller (ECU) 2.

The engine controller 2 controls actions of the engine E, and controls output of the engine E by adjusting an amount of air taken into the engine E, an amount of fuel supplied to the engine E, etc. The engine controller 2 is communicably connected to the driving assistance system controller 1, and the engine controller inputs, as information pertaining to engine control, a signal from an acceleration sensor 21 that detects accelerator pedal depression by a driver, a signal from a speed sensor 22 that detects a speed of the engine E, a signal from a water temperature sensor 23 that detects a temperature of cooling water for the engine E, etc. The engine E is not provided by way of limitation as to the propulsion source of the vehicle; the propulsion source may be an electric motor or a combination of the engine E and an electric motor. A suitable controller would naturally replace the engine controller 2 depending on the type of propulsion source.

The driving assistance system controller 1 sets various control parameters pertaining to autonomous driving of the vehicle and outputs command signals corresponding to the control parameters to various devices (e.g., the engine E and an automatic transmission (not shown)) associated with autonomous driving. In the present embodiment, the term "autonomous driving" refers to a driving state in which, based on observations made by the driver, it is possible at any time for the driver to return to manual driving as the driver chooses, and the operations of acceleration, braking, and steering are all the function of the control system. This driving state is not provided by way of limitation as to classifications of automatization or levels of autonomous driving to which the present embodiment can be applied. In the present embodiment, vehicle speed is basically controlled under autonomous driving so as to approach a target vehicle speed set by the driver or established by law, etc., barrier lines displayed on the road are recognized, and the barrier lines are used as a reference to control a position of the host vehicle in a lane being traveled in. An acceleration rate or deceleration rate of the vehicle set when the vehicle speed is controlled and a steering-wheel-turning amount set when the position of the host vehicle is controlled are each equivalent to a control parameter pertaining to autonomous driving.

In addition to the engine E, the vehicle control system S comprises, as devices associated with autonomous driving of the vehicle, an autonomous steering device 11, an autonomous wheel brake device 12, and an autonomous parking brake device 13. The autonomous steering device 11, the autonomous wheel brake device 12, and the autonomous parking brake device 13 can each be activated in accordance with a command signal from the driving assistance system controller 1. The autonomous steering device 11 is a device for changing an advancing direction and reversing direction of the vehicle during autonomous driving, the autonomous wheel brake device 12 is a device for causing braking force to be generated in the vehicle regardless of operation of a brake pedal by the driver, and the autonomous parking brake device 13 is a device for autonomously actuating a parking brake when a system starter switch of the vehicle is in an off state.

Furthermore, the vehicle control system S comprises a switch device 14 for switching between autonomous driving and manual driving as the driver chooses and setting a travel condition during autonomous driving, and a display device 15 for informing the driver of the actuated state of autonomous driving and the travel state of the vehicle. In the present embodiment, the switch device 14 is configured as a collective switch (referred to below as a "handle switch") provided adjacent to a gripped part of a steering wheel, and is provided with an operation part for switching autonomously between on and off and also switching a set vehicle speed and a set vehicle-to-vehicle distance. The display device (referred to below as a "meter display") 15 is installed in a dashboard of a driver's seat, configured such that the on or off state of autonomous driving can be visually recognized (for example, by using different display colors for the on state and the off state of autonomous driving), and provided with a display section that displays the set vehicle speed and the set vehicle-to-vehicle distance. The display device 15 can also be realized in the form of a head-up display.

In the present embodiment, the driving assistance system controller 1 and the engine controller 2 are configured as electronic control units that are each provided with a microcomputer composed of a central computation device (CPU), a ROM, RAM, and other various storage devices, an input/output interface, etc.

The driving assistance system controller 1 inputs, as information pertaining to autonomous driving, not only a signal from the handle switch 14, but also a signal from a travel environment recognition device 16 and a traveling vehicle monitoring device 17.

The travel environment recognition device 16 is for recognizing the environment or surrounding situation where the host vehicle is located, and can be realized in the form of, for example, an optical camera sensor. The travel environment recognition device 16 may be composed of a plurality of optical camera sensors having different sensing distances or viewing angles.

The traveling vehicle monitoring device 17 is for monitoring a preceding vehicle in a range not more than a predetermined distance ahead of the host vehicle, and can be realized in the form of an optical camera sensor, as well as a radar sensor, e.g., a milli-wave radar sensor. The traveling vehicle monitoring device 17 outputs a signal corresponding to a headway distance between the host vehicle and a preceding vehicle when there is a preceding vehicle. Based on the signal from the traveling vehicle monitoring device 17, a relative speed of the preceding vehicle, relative to the host vehicle, can be specifically detected from a rate of change per unit time in the headway distance.

The travel environment recognition device 16 and the traveling vehicle monitoring device 17 need not be discrete sensors and can also be configured as one sensor unit; these devices can be configured together from an optical camera sensor, a laser radar sensor (LiDAR), etc.

The driving assistance system controller 1 further inputs signals from a road traffic information reception device 18 and a vehicle position detection device 19 as information pertaining to autonomous driving.

The road traffic information reception device 18 receives Vehicle Information and Communication System (VICS™) information and other road traffic information from a base station outside of the vehicle, and can be embodied by, for example, a car navigation system in which road map information is stored.

The vehicle position detection device 19 detects a position of the host vehicle (specifically, a position on a road map), and can be realized in the form of, for example, a positioning data receiver (referred to below as a "GPS receiver") of a global positioning system (GPS). GPS positioning data can be corrected by an inertial navigation unit using a gyro sensor, a vehicle speed sensor, etc., and accuracy of position detection can be improved.

In addition to the above, the driving assistance system controller 1 inputs a signal from a vehicle speed sensor 24, which detects a vehicle speed VSP. A signal indicating the vehicle speed VSP can be inputted via the engine controller 2.

Actions of Control System

In this vehicle control system S, when autonomous driving is selected by operating the handle switch 14, required acceleration and deceleration rates required in the host vehicle are set based on the traveling state of the host vehicle, the traveling state of a vehicle (e.g., a preceding vehicle) other than the host vehicle, the surrounding traffic situation, etc. The driving assistance system controller 1 sets a required propulsion force for the vehicle needed to achieve the required acceleration rate, and outputs to the engine controller 2 a command signal for causing an output torque corresponding to the required propulsion force to be generated by the engine E, which is the propulsion source. The driving assistance system controller 1 further sets a required braking force for the vehicle needed to achieve the required deceleration rate, and outputs a command signal corresponding to the required braking force to the autonomous wheel brake device 12.

In the present embodiment, the driving assistance system controller 1 designates a maximum vehicle speed indicated by a road sign or established by law, etc., as a limit vehicle speed, selects whichever is the lower of the vehicle speed set by the driver (sometimes referred to below as the "set vehicle speed") and the limit vehicle speed, and sets this selected speed as a target vehicle speed. The required driving force is set and a command signal for the engine controller 2 is outputted so that the vehicle speed is made to approach the target vehicle speed at the required acceleration rate corresponding to the current speed of the host vehicle. The vehicle thereby basically performs steady-speed travel at the target vehicle speed during autonomous driving.

On the other hand, the driving assistance system controller 1 uses the optical camera sensor 16 to recognize barrier lines displayed on the road surface ahead of the host vehicle, and uses the barrier lines as a reference to control the position of the host vehicle in the lane being traveled in. When barrier lines can be recognized on both the left and right sides of the host vehicle, the driving assistance system controller 1 executes both-side recognition control and controls the position of the host vehicle based on the left and right barrier lines, and when a barrier line can be recognized on only one side to the left or right of the host vehicle, the driving assistance system controller 1 executes one-side recognition control and controls the position of the host vehicle based on the barrier line on that side. In the present embodiment, the position of the host vehicle is controlled to as to keep the host vehicle in the center of the lane being traveled in in the case of both-side recognition control, and the position of the host vehicle is controlled so as to maintain a constant distance from the recognized barrier line in the case of one-side recognition control. The term "barrier lines" refers to all markings demarcating a lane, including not only a roadway outside line, a lane boundary line, and a roadway center line, but also a pedestrian crossing guide line at an intersection, a barrier line indicating an approach of an on-road obstacle, a barrier line demarcating a slip lane, and a barrier line indicating a change in roadway width or in the number of lanes.

Autonomous driving is canceled by the handle switch 14 being operated by the driver or by any operation associated with vehicle behavior being performed (e.g., the steering wheel or the brake pedal being operated by the driver).

The description below envisions a case in which on a road continuing straight, a host vehicle V does not follow a preceding vehicle but independently advances straight under autonomous driving.

Figure 4:
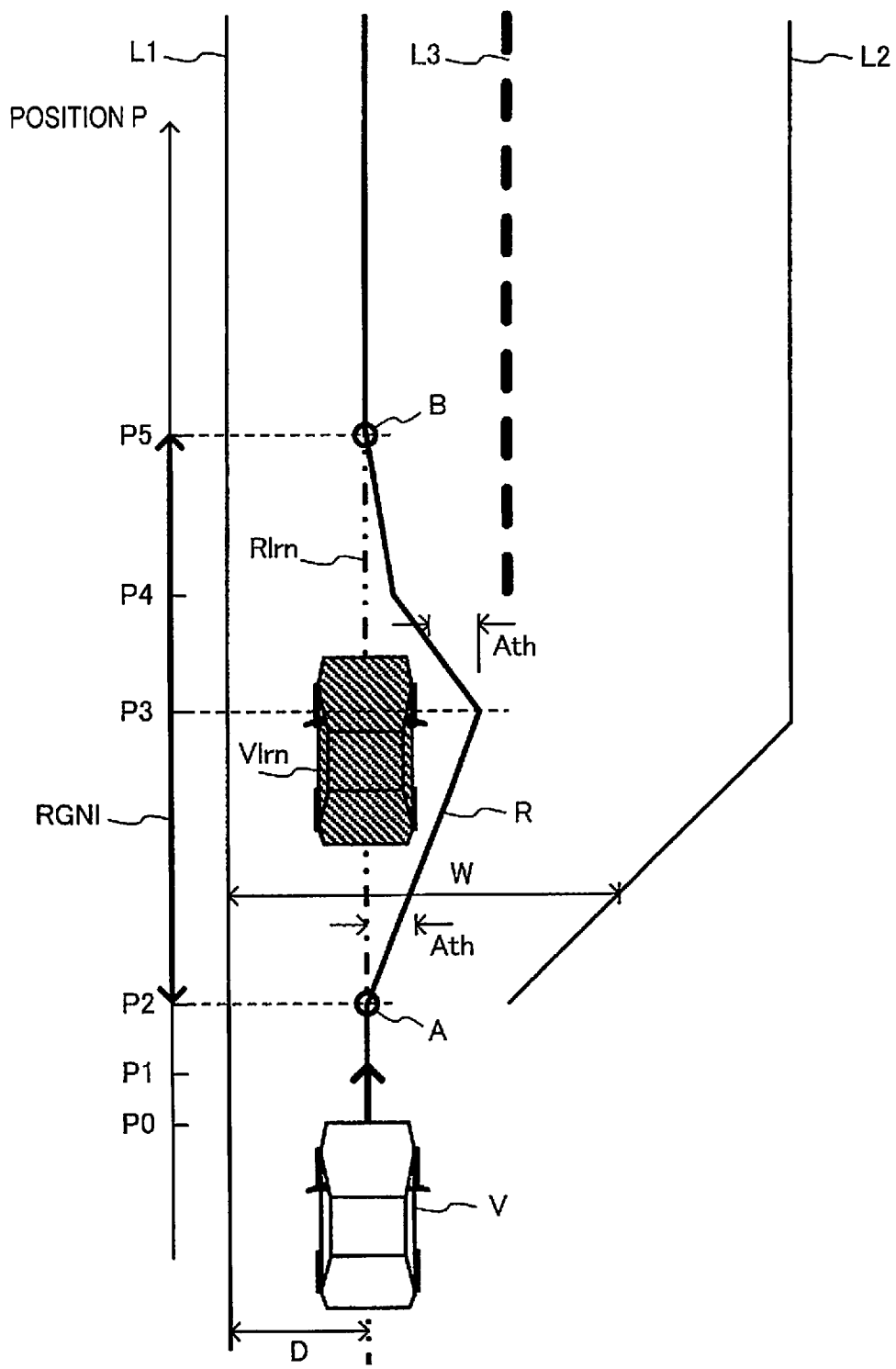
FIG. 4 is a schematic diagram of an example (when the number of lanes increases) of an action of an autonomously driven vehicle under the lane recognition control according to the same embodiment.

FIG. 4 shows the behavior of the host vehicle V when lane recognition control according to the present embodiment is carried out.

A number of lanes ahead of the host vehicle V in a position P0 increases, and a width W of the road expands with this increase. The expansion of the width W is displayed by a barrier line L2. The host vehicle V is in the position P0 before the widening at the current time point, and the lane currently being traveled in is demarcated by only a barrier line (roadway outside line) L1 displayed to the left of the host vehicle V. After the widening, a left lane is demarcated by barrier lines L1, L3 (roadway outside line L1, lane boundary line L3), and a right lane is demarcated by barrier lines L2, L3 (roadway outside line L2, lane boundary line L3). The left lane after the widening is an extension of the lane in which the host vehicle V is currently traveling.

In the present embodiment, autonomous driving is executed while control is switched between both-side recognition control and one-side recognition control in such situations.

Up to a position P1, which is closer than a position P2 where the road begins to widen, autonomous driving is executed by one-side recognition control using only the barrier line L1 to the left of the host vehicle V as a reference, and the host vehicle V is controlled to a position a predetermined distance D from the barrier line L1. From the position P1 onward, control is switched and autonomous driving is executed by both-side recognition control using the left and right barrier lines as a reference. After the switching of control, when the road begins to widen (position P2), the position of the host vehicle V is changed toward the right as the right barrier line L2 extends in a direction away from the left barrier line L1. When the barrier line L3 ahead of the host vehicle V is then recognized by the driving assistance system controller 1, the referenced right barrier line is switched from the barrier line L2 to the barrier line L3 and the position of the host vehicle V is set anew based on the barrier lines L1, L3. Due to this procedure, an advancing direction of the host vehicle V is switched back to the left (position P3) and the host vehicle V is caused to approach the center of the left lane after the widening (position P5).

At this point, it is normal for occupants (the driver and other passengers) of the host vehicle V in the position P0 to expect that the host vehicle V will maintain the advancing direction even after the road widens and will enter the extension lane, and a position change accompanying the road widening would therefore often be sudden for the occupants. When the host vehicle V sways greatly due to the position change, it is not simply that the ride quality worsens, the swaying could also cause the driver to reflexively steer back in the other direction.

In the present embodiment, learning control (referred to below as "region learning") is executed in which the region currently being traveled in is stored as a steering-wheel-turned region when the steering wheel is turned in one direction and subsequently turned in a returning direction due to the switching of control between the both-side recognition control and the one-side recognition control. Autonomous driving under the control preceding the steering-wheel-turned region is continued during travel through the steering-wheel-turned region when the steering-wheel-turned region is subsequently traveled in. In other words, when the control preceding the steering-wheel-turned region is both-side recognition control, autonomous driving under both-side recognition control is continued to travel through the steering-wheel-turned region, and when the control preceding the steering-wheel-turned region is one-side recognition control, autonomous driving under one-side recognition control is continued to travel through the steering-wheel-turned region. In the present embodiment, the on-road region learned as the steering-wheel-turned region is a range RGNI from a location A of the position P2 where the steering wheel is turned in the one direction after the switching of control, to a location B of the position P5 where the steering wheel is turned in the returning direction and the advancing direction of the host vehicle V stabilizes. In the description below, a series of steering wheel turns started by a switching of control and including turning the steering wheel in the one direction and in the returning direction is sometimes referred to as "repeated turning of the steering wheel." The term "returning direction" refers to the direction opposite the "one direction;" for example, the left direction in the case that the "one direction" is the right direction.

Description According to Flowchart

Figure 2:
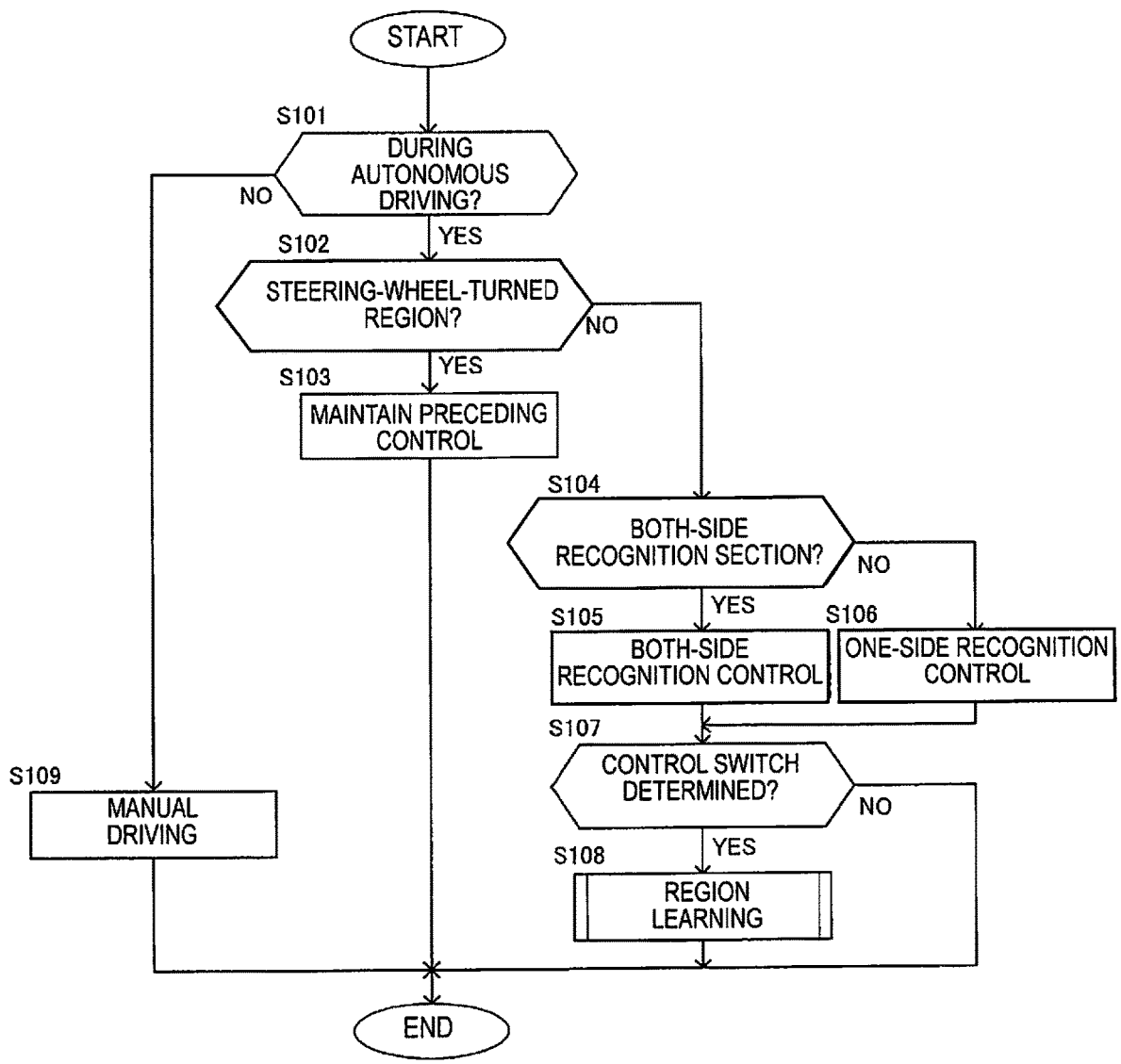
FIG. 2 is a flowchart of a basic flow of lane recognition control executed by the control system according to the same embodiment.
Figure 3:
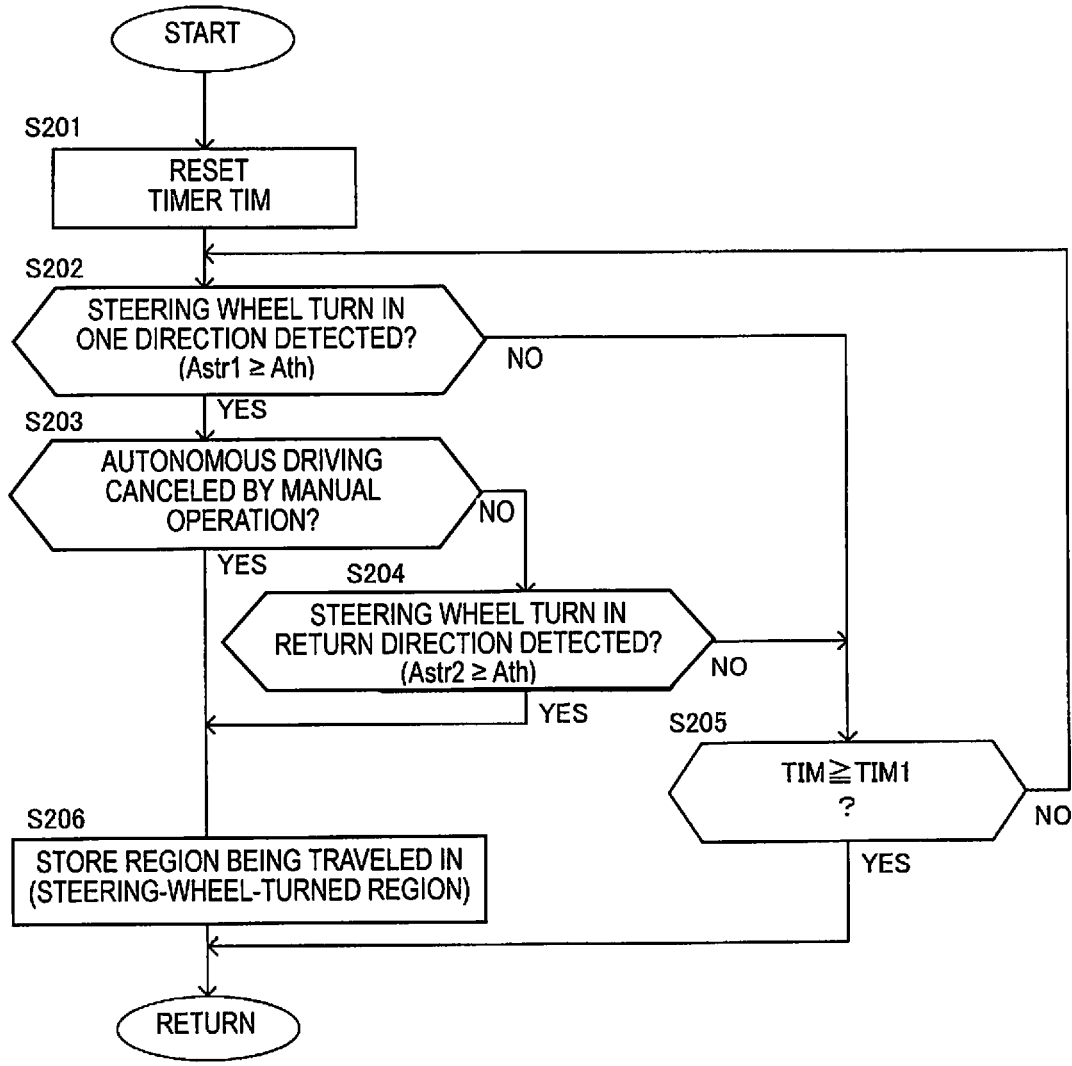
FIG. 3 is a flowchart of specifics of a region learning process of the lane recognition control according to the same embodiment.

FIG. 2 uses a flowchart to show the basic flow of control (lane recognition control) performed by the driving assistance system controller 1, as pertaining to autonomous driving according to the present embodiment. FIG. 3 uses a flowchart to show specifics of the region learning process executed in lane recognition control. The driving assistance system controller 1 is programmed so as to execute lane recognition control at predetermined time intervals, and the controller 1 executes the region learning process as a subroutine of lane recognition control (S108 of FIG. 2).

In the flowchart shown in FIG. 2, whether or not the host vehicle is currently in autonomous driving is determined in S101. Whether or not the host vehicle is currently in autonomous driving can be determined based on a signal from the handle switch 14. When the host vehicle is currently in autonomous driving, the process advances to S102, and when the host vehicle is not currently in autonomous driving, the process advances to S109. In the present embodiment, the premise of autonomous driving under lane recognition control is that the barrier line on at least one of the left and right sides of the host vehicle V can be recognized.

In S102, whether or not the steering-wheel-turned region RGNI is being traveled in is determined. Whether or not the steering-wheel-turned region RGNI is being traveled in can be determined by verifying the road map information stored in the car navigation system 18 and the position of the host vehicle V acquired by the GPS receiver 19. When the steering-wheel-turned region RGNI is being traveled in, the process advances to S103; otherwise the process advances to S104.

In S103, whichever of the both-side recognition control and one-side recognition control was executed in the preceding lane recognition control is maintained. In other words, when the preceding executed control is both-side recognition control, both-side recognition control continues to be performed following on from the preceding time, and when the preceding executed control is one-side recognition control, one-side recognition control continues to be performed following on from the preceding time. Due to this configuration, when the steering-wheel-turned region RGNI is being traveled in after the steering-wheel-turned region RGNI is stored by the region learning, autonomous driving under the control preceding the steering-wheel-turned region RGNI is continued while the host vehicle V is in the steering-wheel-turned region RGNI.

In S104 to 106, control is switched between both-side recognition control and one-side recognition control. Specifically, as a result of the determination in S104, when the barrier lines on both the left and right sides of the host vehicle V can be recognized, the process advances to S105 and both-side recognition control is selected; otherwise, or specifically when only the barrier line on either one of the left and right sides can be recognized, the process advances to S106 and one-side recognition control is selected.

In S107, whether or not control has been switched between both-side recognition control and one-side recognition control is determined. A determination flag is set, it being possible for the determination flag value to differ between cases where autonomous driving is performed under both-side recognition control (S105) and cases where autonomous driving is performed under one-side recognition control (S106), and whether or not there has been a switching of control can be determined according to whether or not the value of the determination flag has switched. The process advances to S108 only when there has been a switching of control; otherwise the current control is ended without the process going through S108.

In S108, region learning is executed according to the flowchart shown in FIG. 3.

In S109, driving is executed according to a manual operation performed by the driver, and the advancing direction of the host vehicle V is controlled in coordination with the movement of the steering wheel.

The process transitions to the flowchart in FIG. 3, and in S201, a timer TIM is resent. The timer TIM measures an elapsed time since the switching of control between both-side recognition control and one-side recognition control.

In S202, a determination is made as to whether or not a turn of the steering wheel in one direction under autonomous driving has been detected. In the present embodiment, after the switching of control, a determination is made as to whether or not a turn of the steering wheel up to a predetermined amount Ath in the left or right direction has been detected. This may be determined in relation to a magnitude of an angle change from a reference position (for example, a neutral position at which the vehicle advances straight) of steered wheels (commonly propelling wheels), or in relation to an amount of the angle change per unit time. When such a turn of the steering wheel has been detected, the process advances to S203, and when such a turn of the steering wheel has not been detected, the process advances to S205.

In S203, a determination is made as to whether or not manual operation of the steering wheel by the driver has been detected. For example, after the steering wheel is turned in one direction, a determination is made as to whether or not the driver has turned the steering wheel back to the advancing direction by manual operation. When manual operation of the steering wheel has been detected, the process advances to S206, and when manual operation has not been detected, the process advances to S204. When the steering wheel has been manually operated, autonomous driving is canceled.

In S204, a determination is made as to whether or not a turn of the steering wheel in the returning direction by autonomous driving has been detected. In the present embodiment, after the steering wheel is turned in the one direction, a determination is made as to whether or not a turn of the steering wheel up to the predetermined amount Ath in the returning direction has been detected; when such a turn of the steering wheel has been detected, the process advances to S206, and when such a turn of the steering wheel has not been detected, the process advances to S205. The predetermined amount Ath relating to the determination of the turn of the steering wheel in the returning direction may be the same value as or a different value from the predetermined amount relating to the determination of the turn of the steering wheel in the one direction previously described (S2020. Furthermore, as was previously described, the determination can be performed not only according to an amount equivalent to the angle change, but also according to the amount of change per unit time.

In S205, a determination is made as to whether or not the timer TIM has reached a predetermined value TIM1. When the timer has reached the predetermined value TIM1, the current control is ended, and when the timer has not reached this value, the process returns to S202 and the process of steps S202 to 204 is repeatedly executed. A time indicated by the predetermined value TIM1 can be set based on the relationship with the predetermined amount Ath, using as a reference the occupants' sensations experienced with the repeated turning of the steering wheel; for example, this time is 5 seconds.

In S206, the region RGNI currently being traveled in is stored in association with the road map information stored in the car navigation system 18. As was previously described, after the steering wheel is turned in the returning direction, the position P5 where the advancing direction of the host vehicle V stabilizes is specified, and the region RGNI, which is from the location A of the position P2 where the steering wheel was turned in the one direction to the location B of the position P5 where the advancing direction of the host vehicle V stabilizes, is stored as the steering-wheel-turned region.

In the present embodiment, a "traffic condition acquisition unit" is configured from the optical camera sensor 16, and a "travel control unit" is configured from the driving assistance system controller 1 and the autonomous steering device 11.

Description of Effects

The control device (vehicle control system S) for the autonomously driven vehicle according to the present embodiment is configured as described above, and the effects achieved by the present embodiment are summarized below while referring to FIG. 4 as appropriate.

Firstly, during travel under autonomous driving, the region RGNI currently being traveled in is stored as a steering-wheel-turned region when there has been repeated turning of the steering wheel (positions P2, P3) due to a switching of control between both-side recognition control, which uses the barrier lines on both the left and right sides as a reference, and one-side recognition control, which uses the barrier line on either one of the left and right sides as a reference. Autonomous driving under the control preceding the steering-wheel-turned region RGNI (for example, autonomous driving under one-side recognition control when the control preceding the steering-wheel-turned region RGNI is one-side recognition control) is continued when the steering-wheel-turned region RGNI is subsequently traveled in. Due to this configuration, it is possible to avoid sudden turning of the steering wheel (position P2) in one direction started by a switching of control (position P1), and it is possible for the advancing direction preceding entry into the steering-wheel-turned region RGNI to be maintained after entry to minimize any worsening in ride quality, etc., caused by swaying of the host vehicle V to the left and right. A route in which a host vehicle Vlrn travels when under the lane recognition control according to the present embodiment is shown by a double-dot line Rlrn in FIG. 4, in contrast to a route R (host vehicle V) when not under this control.

Secondly, when there has been repeated turning of the steering wheel during the predetermined time TIM1 (e.g., five seconds) from the switching of control (position P1), the region RGNI currently being traveled in is stored. Due to this feature, it is possible to be appropriately selective with turns of the steering wheel that should be avoided, and it is possible to avoid adverse effects on lane recognition control due to regions being learned unnecessarily.

Thirdly, when the extent of the turning of the steering wheel (e.g., steering-wheel-turning amounts Astr1, Astr2) in the one direction and the returning direction reach the predetermined amount Ath, the region RGNI currently being traveled in is stored with the premise that there has been repeated turning of the steering wheel. It is thereby possible, when traveling through the steering-wheel-turned region RGNI, to execute autonomous driving through control after a switch within a range such that the effect on ride quality, etc., can be minimized.

Fourthly, after the steering wheel is turned in the one direction because of a switching of control (position P2), when the steering wheel is turned in the returning direction by a manual operation performed by the driver, the region RGNI currently being traveled in is stored (S203 of FIG. 3) regardless of whether or not the steering wheel has been turned in the returning direction by autonomous driving. It is thereby possible for the impression the driver experiences from the turn of the steering wheel in the one direction (position P2) to be directly reflected in the learning of the region, and any worsening of the ride quality, etc., can be more properly minimized. In view of this, repeated turning of the steering wheel is preferably started by a switching of control, and it does not matter whether the steering wheel is turned in the returning direction by autonomous driving or another switching of control (position P3, S204), or by a manual operation performed by the driver (S203). On the other hand, a turn of the steering wheel in the one direction accompanies a switching of control.

The effects achieved by the present embodiment shall be further described using a different scenario from that shown in FIG. 2.

Figure 5:
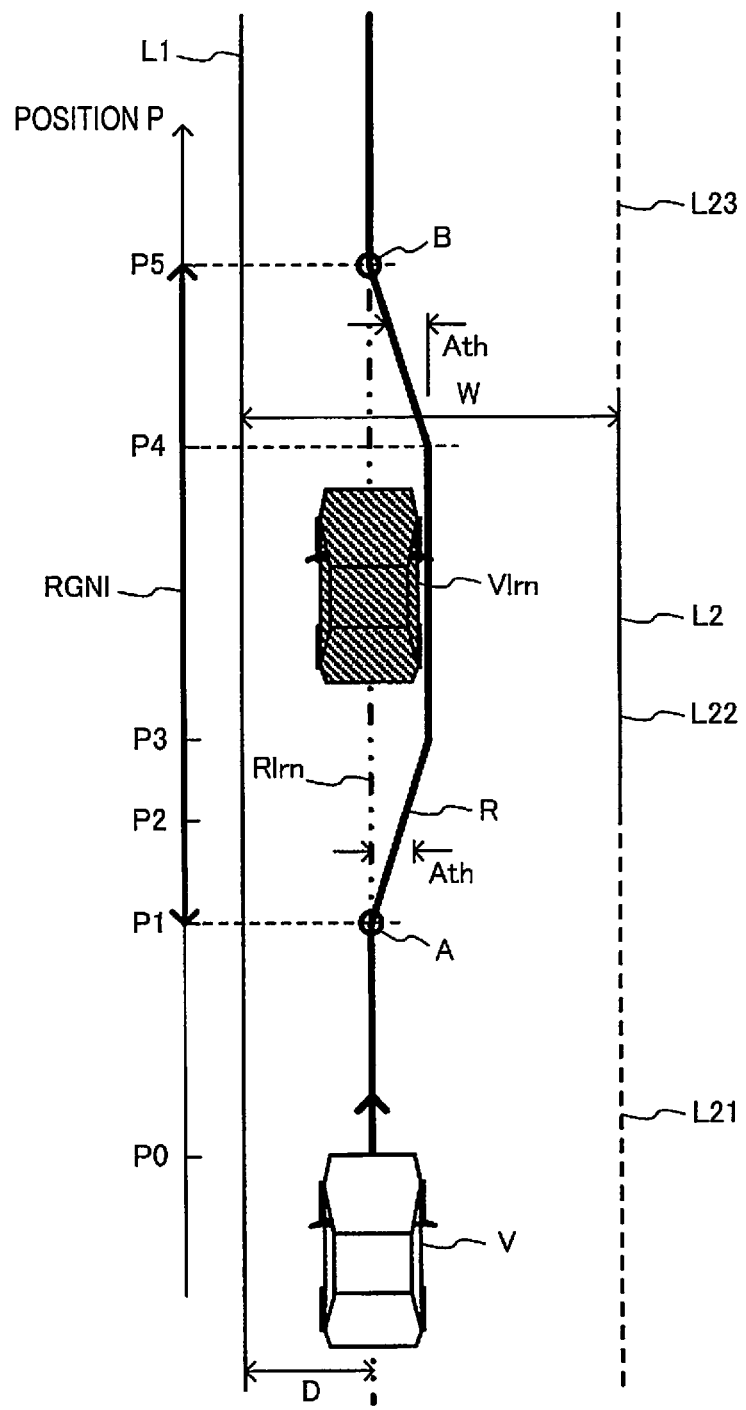
FIG. 5 is a schematic diagram of another example (when a barrier line has partially disappeared) of an action of an autonomously driven vehicle under the lane recognition control according to the same embodiment.

FIG. 5 shows the behavior of the host vehicle V in a case in which the lane recognition control according to the present embodiment is carried out and a barrier line has partially disappeared.

Of the barrier lines L1, L2 that should be on both the left and right sides of the host vehicle V, the right barrier line L2 (e.g., a roadway outside line) has partially disappeared (FIG. 5 uses dotted lines to show parts L21, L23 where the barrier line L2 has disappeared). Therefore, the road or lane in which the host vehicle V is traveling should be demarcated by the barrier lines L1, L2 that were originally on both the left and right sides, but due to the partial disappearance of the barrier line L2, the road or lane is demarcated by the barrier lines L1, L2 (L22) on the left and right sides in a part L22 where the barrier line L2 remains, and by only the left barrier line L1 in other parts L21, L23 where the barrier line L2 has disappeared.

In such a situation, autonomous driving is executed by one-side recognition control, which uses only the barrier line L1 to the left of the host vehicle V as a reference, until the position P1, which is closer than the remaining barrier line L22 (closer than the position P2), and the host vehicle V is controlled to a position a predetermined distance D from the barrier line L1. When the right barrier line L2 (L22) is also recognized in addition to the left barrier line L1, control is switched and autonomous driving is executed by both-side recognition control, which uses the barrier lines L1, L22 on both the left and right sides as a reference. Due to the switching of control, the host vehicle V is caused to approach the right side as the position of the host vehicle V is changed to the center of the lane (position P1). When control is then switched back to one-side recognition control at the position where the remaining barrier line L22 breaks or at a closer position P4, the host vehicle V is controlled to a position referencing the left barrier line L1 (position P5).

Thus, if it is merely that control is switched between both-side recognition control and one-side recognition control when the situation alternates between recognizable barrier lines being on both the left and right sides and being on only one of the left and right sides, control will be switched repeatedly (positions P1, P4), whereby the host vehicle V will sways left and right depending on the control settings, the width W of the road, etc. While occupants of the host vehicle V assume that the host vehicle V is advancing straight because the road being traveled in is one lane, a change in position accompanying a switching of control would be sudden for the occupants, and ride quality would be unavoidably affected. Moreover, this sudden change could also cause the driver to reflexively steer back in the other direction, as in the previous example (FIG. 4).

As a countermeasure to this, in the present embodiment, region learning is executed and a region RGNI in which the steering wheel is turned in the one direction and the returning direction, i.e., there has been repeated turning of the steering wheel, is stored as a steering-wheel-turned region when there has been a switching of control between both-side recognition control and one-side recognition control. When the steering-wheel-turned region RGNI is subsequently traveled in, autonomous driving under the control preceding the steering-wheel-turned region RGNI is continued while the steering-wheel-turned region RGNI is being traveled in. Specifically, the region RNGI is stored as the steering-wheel-turned region, this region RNGI starting at the location A of the position P1 where the steering wheel is turned in the one direction due to the recognition of the remaining barrier line L22, which includes the steering wheel being turned in the returning direction (position P4) due to a change in the barrier line being referenced, and the region RNGI ending at the location B of the position P5 where the advancing direction of the host vehicle V stabilizes, and during subsequent travel, one-side recognition control is executed in continuation from before the steering-wheel-turned region RGNI.

Due to this configuration, it is possible to avoid sudden turning of the steering wheel (position P1) in the one direction started by a switching of control, and as shown by the double-dotted line Rlrn in FIG. 5, the advancing direction preceding entry into the steering-wheel-turned region RGNI can be continued after entry and any worsening in ride quality, etc., due to left and right swaying of the host vehicle V can be minimized.

Description of Other Embodiments

Figure 6:
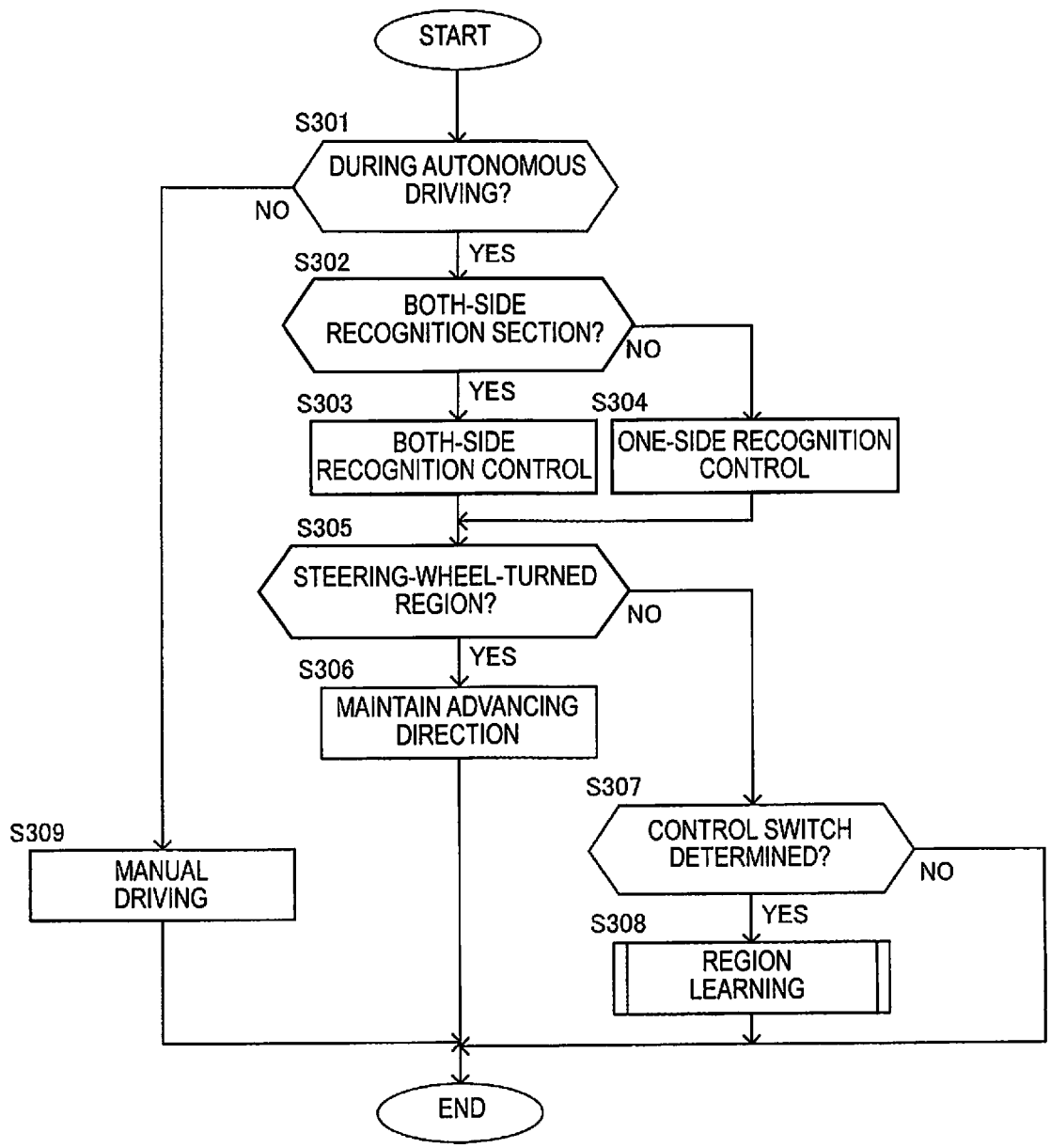
FIG. 6 is a flowchart of a basic flow of lane recognition control according to another embodiment of the present invention.

FIG. 6 is a flowchart of a basic flow of lane recognition control according to another embodiment of the present invention.

In the previous embodiment, when the steering-wheel-turned region RGNI is traveled in after region learning, a switching of control in the steering-wheel-turned region RGNI is deferred or substantially disallowed, and after the steering-wheel-turned region RGNI has been passed through, an assessment is made anew in accordance with the situation of barrier line recognition, and control is executed. By contrast, in the present embodiment, although switching of control in the steering-wheel-turned region RGNI is allowed, the advancing direction preceding the steering-wheel-turned region RGNI is continued after entry into the steering-wheel-turned region RGNI, whereby sudden swaying of the host vehicle V is avoided.

A description shall now be given with a focus on the difference with control according to the present embodiment (FIG. 2), with reference being made to FIG. 4, as appropriate. During travel under autonomous driving (S301), control is switched between both-side recognition control and one-side recognition control (S302-304), and whether or not the host vehicle V is in the steering-wheel-turned region RGNI is determined (S305). When the host vehicle is in the steering-wheel-turned region RGNI, the advancing direction during the preceding execution is maintained (S306) and the steering wheel is prevented from being turned by to a switching of control regardless of what the control after the switching is. On the other hand, when the host vehicle is not in the region RGNI, turning of the steering wheel that would accompany a switching of control (S307) is allowed, and region learning is executed (S308).

In the description above, a case of control being switched from one-side recognition control to both-side recognition control was described, but this example is not provided by way of limitation; a switching of control started by a turn of the steering wheel (specifically, a turn of the steering wheel in the one direction) may be made from both-side recognition control to one-side recognition control.

Furthermore, a case was described in which the advancing direction of the host vehicle V does not change before and after entry into the steering-wheel-turned region RGNI (for example, FIG. 4), but control in the steering-wheel-turned region RGNI may be such that after entry into the steering-wheel-turned region RGNI, the lane preceding the steering-wheel-turned region RGNI is maintained even while there is some variation in the advancing direction, or the host vehicle is prompted to enter a lane that is an extension of the lane preceding the steering-wheel-turned region RGNI.

Furthermore, a case was described in which when a steering-wheel-turned region RGNI is stored, an elapsed time TIM since a switching of control is measured, and there has been repeated turning of the steering wheel within a predetermined time TIM1 following the switching of control, the region currently being traveled in is stored, but the measured time may be an elapsed time since the steering wheel was turned in the one direction, and when the steering wheel is turned in the returning direction within a predetermined time (e.g., five seconds) following the turn of the steering wheel in the one direction, the region currently being traveled in may be stored. It is thereby possible to be appropriately selective with steering wheel turns that should be avoided, and it is possible to avoid lane recognition control being adversely affected due to regions being learned unnecessarily.

The region RGNI stored as the steering-wheel-turned region may include extra distance for precision in barrier line recognition, etc., added to the region starting at the location A where the steering wheel is turned in the one direction and ending at the location B where the advancing direction stabilizes after the steering wheel is turned in the returning direction; this addition may be made before said region, after said region, or both before and after said region. In other words, the steering-wheel-turned region RGNI can be set as appropriate as a region where there has been a series of steering wheel turns, started by a switching of control and including turning back in the other direction.

An embodiment of the present invention was described above, but the above embodiment merely presents part of an example of application of the present invention, there being no intention to limit the technical range of the present invention to the specific configuration of the above embodiment. Various changes and revisions can be made to the above embodiment within range of the matters set forth in the claims.

The invention claimed is:

1. An autonomous vehicle control method for autonomously controlling a host vehicle in which a position of the host vehicle in a lane being traveled in is controlled using barrier lines demarcating a lane as a reference, the autonomous vehicle control method comprising:
   recognizing the barrier lines ahead of the host vehicle;
   executing autonomous driving by either a both-side recognition control in which the position of the host vehicle is controlled based on the barrier lines on both the left and right sides of the host vehicle, or a one-side recognition control in which the position of the host vehicle is controlled based on the barrier line on either one of the left and right sides of the host vehicle;
   storing a region currently being traveled in as a steering-wheel-turned region when a steering wheel is turned in one direction and subsequently turned in a returning direction due to a switching of control between the both-side recognition control and the one-side recognition control; and
   continuing autonomous driving under the control preceding the steering-wheel-turned region when the steering-wheel-turned region is subsequently traveled in.

2. The autonomous vehicle control method according to claim 1, wherein
   when the steering wheel is turned in the returning direction within a predetermined time since the switching of control, a region currently being traveled in is stored as the steering-wheel-turned region.

3. The autonomous vehicle control method according to claim 2, wherein
   the region currently being traveled in is stored when a steering-wheel-turning amount of at least one of a steering wheel turn in the one direction and a steering wheel turn in the returning direction is equal to or greater than a predetermined value.

4. The autonomous vehicle control method according to claim 1, wherein
   after the steering wheel is turned in the one direction due to a switch from the both-side recognition control to the one-side recognition control or a switch from the one-side recognition control to the both-side recognition control, a region currently being traveled in is stored as the steering-wheel-turned region when the steering wheel is turned in the returning direction within a predetermined time.

5. The autonomous vehicle control method according to claim 1, wherein
   a steering wheel turn in the returning direction is a steering wheel turn made by a manual operation performed by a driver.

6. An autonomous vehicle control method for autonomously controlling a host vehicle in which a position of the host vehicle in a lane being traveled in is controlled using barrier lines demarcating a lane as a reference, the autonomous vehicle control method comprising:
   recognizing the barrier lines ahead of the host vehicle;
   executing autonomous driving by either a both-side recognition control in which the position of the host vehicle is controlled based on the barrier lines on both the left and right sides of the host vehicle, or a one-side recognition control in which the position of the host vehicle is controlled based on the barrier line on either one of the left and right sides of the host vehicle;
   storing a region currently being traveled in as a steering-wheel-turned region when the steering wheel is turned in one direction and subsequently turned in a returning direction due to a switching of control between the both-side recognition control and the one-side recognition control; and
   maintaining an advancing direction preceding the steering-wheel-turned region when the steering-wheel-turned region is subsequently traveled in, regardless of the control after the switching.

7. An autonomous vehicle control device comprising:
   a traffic condition acquisition unit that acquires a traffic condition of a road on which a host vehicle is traveling; and
   a travel control unit that controls a traveling state of the host vehicle during travel under autonomous driving;
   the traffic condition acquisition unit being configured to acquire information pertaining to barrier lines displayed on a road surface ahead of the host vehicle as the traffic condition; and
   the travel control unit being configured to carry out
   setting a control parameter pertaining at least to steering of the host vehicle,
   switching control between a both-side recognition control for acquiring information pertaining to the barrier lines on both the left and right sides of the host vehicle and a one-side recognition control for acquiring information pertaining to the barrier line on either one of the left and right sides of the host vehicle when setting the control parameter,
   storing a region currently being traveled in as a steering-wheel-turned region when the steering wheel is turned in one direction and subsequently turned in a returning direction due to the switching of control between the both-side recognition control and the one-side recognition control, and
   continuing autonomous driving under the control preceding the steering-wheel-turned region when the steering-wheel-turned region is subsequently traveled in.

* * * * *